March 16, 1948.     E. W. HART     2,437,692

MAGNETIC COMPASS

Filed May 3, 1945

INVENTOR.
EDWARD W. HART
BY
Ralph L Chappell
ATTORNEY.

Patented Mar. 16, 1948

2,437,692

UNITED STATES PATENT OFFICE 2,437,692

MAGNETIC COMPASS

Edward W. Hart, San Diego, Calif.

Application May 3, 1945, Serial No. 591,770

4 Claims. (Cl. 33—225)

(Granted under the act of March 3, 1883, as amended April 30, 1928; 370 O. G. 757)

This invention relates to a magnetic compass.

A magnetic compass used on board ship is subject to error, called "deviation," due to the presence of magnetic forces in the ship. Such magnetic forces are caused principally by permanent or sub-permanent magnetism in the steel or hard iron of the ship and magnetism induced in the soft iron of the ship by the magnetic field of the earth. In practice these forces are compensated so that the deviation is reduced to a minimum and the compass needle points as nearly as possible to the magnetic pole of the earth.

Certain of the magnetic forces present produce a deviation which is semi-circular in character; that is, there are two headings of the ship in which the deviation caused by such forces reaches a maximum. Other magnetic forces present produce a deviation which is quadrantal in character; that is, there are four headings in which the deviation reaches a maximum. Still other forces produce deviations of higher orders, such as sextantal or decantal.

Semi-circular deviation is compensated by means well known in the art. Quadrantal deviation may be compensated by means known in the art, although I prefer to employ the novel means described and claimed in my co-pending application, Serial No. 592,151, Navy case No. 4559, filed co-incidentally with this application, entitled "Quadrantal corrector for magnetic compass."

Heretofore no provision has been made for compensating deviations of higher orders. Such deviations cannot be compensated by the use of correctors heretofore used and they interfere with normal compensation procedure. It is due mainly to the presence of these deviations of higher orders that some deviation remains after a compass has been compensated to the best degree possible.

I have found that the principal deviations of higher order that produce error in the compass are the sextantal deviation and the decantal deviation and that it is possible to eliminate either or both of these deviations by constructing a compass with a plurality of needles having the proper relationship of pole strengths and positioned with the proper relationship of pole angles.

It is the principal object of this invention to provide a magnetic compass in which either the sextantal deviation or the decantal deviation or both are eliminated.

It is a further object of my invention to provide for carrying out the foregoing object in a facile, economical and efficient manner.

In accomplishing these and other objects of the present invention, I have provided improved details of structure, preferred forms of which are illustrated in the accompanying drawings, wherein.

Figure 1:
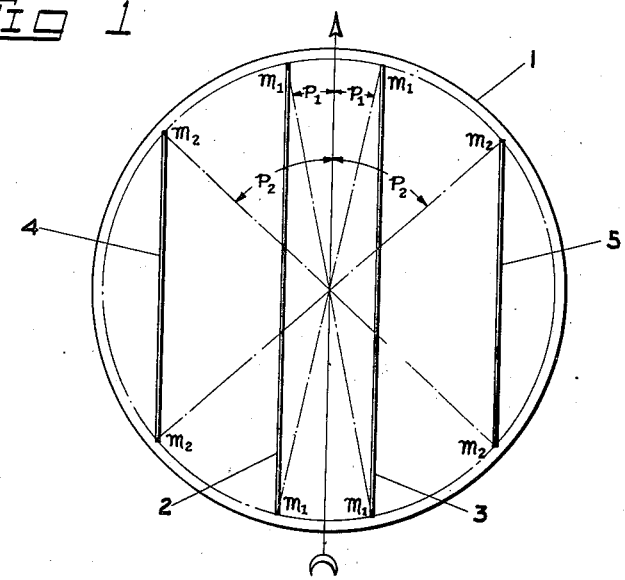
Fig. 1 is a bottom plan view of a magnetic compass card with pole angles and pole strengths indicated symbolically.

Referring more in detail to the drawing:

There is shown at 1 a standard magnetic compass card. The card has secured to the underface thereof, by suitable means, a plurality of magnetic needles 4, in this case four, a standard number. The needles are all parallel and their poles, which are assumed to be located at the ends, lie on the same circle. The north-seeking poles of all the needles are oriented in the same direction, toward the upper end of the card in the showing of Fig. 1. The needles are preferably uniformly linearly magnetized.

The opposite face of the card 1, not shown, is preferably graduated through 360° to indicate the heading in any direction. The card, with the needles attached, is adapted to be floated on a suitable fluid medium in a compass bowl, or otherwise suitably supported.

The pole strength of a magnet is commonly measured in "unit magnetic poles," a "unit magnetic pole" being defined as a pole of such strength that, when placed in a vacuum a distance of one centimeter from a pole of like strength, a force of one dyne is exerted between the poles. The inner needles 2 and 3 preferably have pole strengths as nearly equal to each other as possible and likewise the outer needles 4 and 5 preferably have pole strengths as nearly equal to each other as possible. The pole strengths of the inner and outer needles are represented by the symbols "$m_1$," and "$m_2$" respectively.

The pole angle of a magnetic compass needle is defined as the angle measured between the center line of the compass parallel to the lengths of the needles and a radius from the center point to the pole of the needle. The inner needles 2 and 3 preferably have identical pole angles $p_1$, and likewise the outer needles preferably have identical pole angles $p_2$.

I have found that the sextantal deviation, or the decantal deviation, or both, which would normally occur in a compass of the type shown, may be eliminated by the choice of values of pole strengths $m_1$ and $m_2$ and pole angles $p_1$ and $p_2$

Operation

The magnetic field of the earth acts on the four compass needles and tends to draw them to a position in which the north seeking poles of the needles are directed toward the north magnetic pole of the earth, except that there is some deviational error. In the discussion that follows I will assume that all semi-circular and quadrantal deviation has been compensated by appropriate means. Hence the only deviations that need be considered are those of higher orders.

The deviations of higher orders are introduced in the compass mainly by non-uniformities in the fields of the compass correctors. Sextantal deviation is proportional to the sine or cosine of three times the azimuth angle of the heading and decantal deviation is proportional to the sine or cosine of five times the azimuth angle of the heading.

In the mathematical treatment of the deviations hereinafter discussed, I shall employ the following symbols:

$z$ = magnetic heading
$z'$ = compass heading
$d$ = deviation
$p$ = angle measured from the north point of compass clockwise to a point under consideration.
$s$ = angle measured from a ship's head to a point under consideration.
$m$ = pole strength of compass needle under consideration.
$H$ = magnetic field strength
$T$ = torque about compass center exerted on compass poles.

A subscript appended to any of the above symbols defines a specific component of the item represented by the symbol.

The field of the corrector on the circle of the poles may be expressed in either of two ways, namely, as tangential and radial components or as fore and aft and athwartships components. In the first case the tangential component only need be considered, since the radial component has no torque effect on the needle.

Considering first the first case:

The tangential component is represented by $H_\theta$ which may be expanded as a Fourier's series thus:

$$H_\theta = (a_1 \cos s + a_2 \cos 2s + \ldots + b_1 \sin s + b_2 \sin 2s + \ldots)$$

Under the conditions encountered, no constant term appears in the equation.

The clockwise torque, $T_n$, produced by the $n$th order terms of $H_\theta$ on a single pole of strength, $m$, at position angle $P$, on a pole circle of unit radius is $$T_n = m[a_n \cos n(p-z') + b_n \sin n(p-z')]$$
$$= m[(a_n \cos np + b_n \sin np) \cos nz' + (a_n \sin np - b_n \cos np) \sin nz']$$

since
$$s = p - z'$$

However, the poles occur in sets of four at position angles, $p$, $-p$, $\pi + p$, $\pi - p$. When the effect produced on all four poles is summed, co-efficients of the following form occur:

(1) $\cos np + \cos(-np) - \cos n(\pi + p) - \cos n(\pi - p)$ (2) $\sin np + \sin(-np) - \sin n(\pi + p) - \sin n(\pi - p)$ $(1) = 0$ when $n$ is even
$\quad = 4 \cos np$, when $n$ is odd
$(2) = 0$ Finally, the full torque, $T$, for all terms of $H_\theta$ for a 4-pole set is $$T = 4 \sum_{n=1}^{\infty} m \cos np (a_n \cos nz' - b_n \sin nz')$$

where $n$ is odd.

If more than one 4-pole set is present with pole strengths, $m_1$, $m_2$ ... and position angles, $p_1$, $p_2$ ..., respectively for the first quadrant poles, the full torque is $$T = 4 \sum_{n=1}^{\infty} (m_1 \cos np_1 + m_2 \cos np_2 + \ldots)(a_n \cos nz' - b_n \sin nz')$$

where $n$ is odd.

The counterclockwise torque $T_H$ produced by the earth's horizontal field $H$ is $$T_H = 4H(m_1 \cos p_1 + m_2 \cos p_2 + \ldots) \sin d$$

Equating $T_H$ to $T$ and simplifying, $$\sin d = \frac{1}{HK_1} \sum_{n=1}^{\infty} K_n (a_n \cos nz' - b_n \sin nz')$$

where
$$K_n = m_1 \cos np_1 + m_2 \cos np_2 + \ldots$$

For the second case, the corrector field is represented by the two components, $H_x$ and $H_y$, where $$H_x = a_0 + a_1 \cos s + a_2 \cos 2s + \ldots + b_1 \sin s + b_2 \sin 2s + \ldots,$$

and $$H_y = c_0 + c_1 \cos s + c_2 \cos 2s + \ldots + d_1 \sin s + d_2 \sin 2s + \ldots$$

a similar expression for the deviation can be obtained by a slightly more complex computation. Thus $$\sin d = \frac{1}{2H}[(2a_0 - a_2 - d_2) \sin z' + (2c_0 - b_2 + c_2) \cos z'] + \frac{1}{2HK_1} \sum_{n=1}^{\infty} K_n (a_{n-1} - d_{n-1} - a_{n+1} - d_{n+1}) \sin nz' + (b_{n-1} + c_{n-1} - b_{n+1} + c_{n+1}) \cos nz'$$

where $n$ is again an odd integer.

The two formulas, here derived, can be employed in either of two different ways. They can be used to evaluate compass corrector design and form a concise criterion by which optimum field conditions can be prescribed. They can also be used in compass design.

Referring back to the first case, it is seen that in order to set the deviation of any order equal to zero it is necessary to set $K$ for that order equal to zero. Thus to set the sextantal deviation equal to zero it is necessary to satisfy the following conditions:

$$K_3 = m_1 \cos 3p_1 + m_2 \cos 3p_2 = 0$$

This condition is met when $$\frac{m_1}{m_2} = -\frac{\cos 3p_2}{\cos 3p_1}$$

By the same line of reasoning, to set decantal deviation equal to zero it is necessary that $$K_5 = m_1 \cos 5p_1 + m_2 \cos 5p_2 = 0$$

This condition is met when $$\frac{m_1}{m_2} = -\frac{\cos 5p_2}{\cos 5p_1}$$

To eliminate both sextantal deviation and decantal deviation it is necessary that the foregoing conditions be met simultaneously. Thus the pole angles must have the following relationship:

$$\frac{\cos 3p_1}{\cos 5p_1} = \frac{\cos 3p_2}{\cos 5p_2}$$

and the ratio of pole strengths must have the following relationship to the ratio of pole angles:

$$\frac{m_1}{m_2} = -\frac{\cos 3p_2}{\cos 3p_1} = -\frac{\cos 5p_2}{\cos 5p_1}$$

Figure 2:
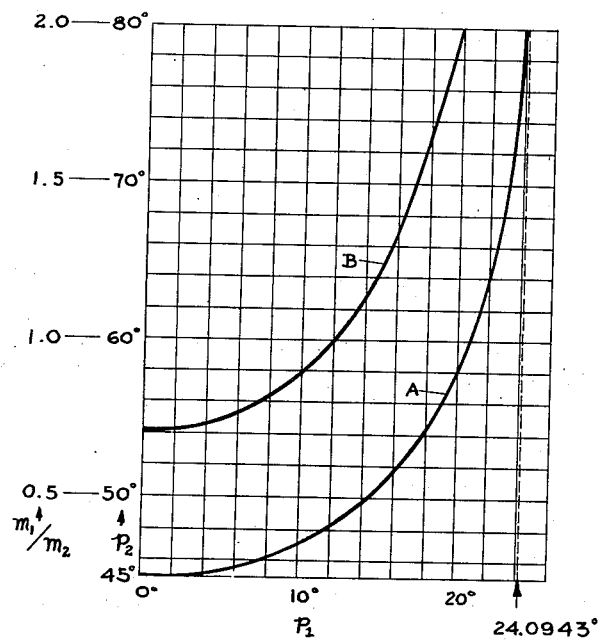
Fig. 2 is a chart graphically illustrating the relationship of pole strengths and pole angles of compasses embodying the principles of my invention.

Fig. 2 shows a graph from which may be determined sets of pole angles and pole strengths that satisfy the last condition and thus eliminate both sextantal deviation and decantal deviation. Curve A shows $p_2$ plotted as a function of $p_1$ and curve B shows $m_1/m_2$ plotted as a function of $p_1$.

To determine sets of value of $m_1/m_2$, $p_1$ and $p_2$ which eliminate both sextantal and decantal deviation, it is necessary merely to choose a set of pole angles that lie on curve A and then from curve B to select the value of $m_1/m_2$ that corresponds to the chosen value of $p_1$. For example, suppose $p_1$ is chosen to be 12°. From curve A it will be seen that $p_2$ should be 48° and from curve B that $m_1/m_2$ should be 1. Corresponding values of $p_2$ and $m_1/m_2$ may likewise be determined for any value of $p_1$ up to 24.0943°, which is the theoretical maximum size possible for $p_1$.

Sets of values which will eliminate either sextantal deviation or decantal deviation, but not both, may readily be determined by solving the equations $$\frac{m_1}{m_2} = -\frac{\cos 3p_2}{\cos 3p_1}$$

or $$\frac{m_1}{m_2} = -\frac{\cos 5p_2}{\cos 5p_1}$$

respectively. The solution of either of these equations is a simple mathematical process. For example, suppose it is desired to eliminate sextantal deviation only and to have $p_1$ equal to 20° and $m_1/m_2$ equal to 1. Solution of the equation $$m_1/m_2 = -\frac{\cos 3p_2}{\cos 3p_1}$$

with these values substituted therein shows that $p_2$ should be 40°. Likewise it is plain that values may be determined to eliminate decantal deviation only.

While I have shown but certain embodiments of my invention, it is apparent that the device is susceptible to other modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In a magnetic compass, a pair of substantially identical inner magnetic needles, a pair of substantially identical outer magnetic needles, said needles being substantially parallel and having their like poles oriented in the same directions and all of their poles lying substantially on the same circle, and having pole strengths and being positioned laterally substantially in accordance with the formula $$\frac{m_1}{m_2} = -\frac{\cos 3p_2}{\cos 3p_1} = -\frac{\cos 5p_2}{\cos 5p_1}$$

wherein $m_1$ and $m_2$ represent the pole strengths of the inner and outer needles respectively, and $p_1$ and $p_2$ represent the pole angles of the inner and outer needles respectively, and means to support said needles in the foregoing relationship.

2. In a magnetic compass, a pair of inner magnetic needles and a pair of outer magnetic needles, said needles being substantially parallel and having their like poles oriented in the same directions and all of their poles lying substantially on the same circle, and having pole strengths and being positioned substantially in accordance with the formula $$\frac{m_1}{m_2} = -\frac{\cos 3p_2}{\cos 3p_1}$$

wherein $m_1$ and $m_2$ represent the pole strengths of the inner and outer needles respectively and $p_1$ and $p_2$ represent the pole angles of the inner and outer needles respectively.

3. In a magnetic compass, a pair of inner magnetic needles and a pair of outer magnetic needles, said needles being substantially parallel and having their like poles oriented in the same directions and all of their poles lying substantially on the same circle, and having pole strengths and being positioned substantially in accordance with the formula $$\frac{m_1}{m_2} = -\frac{\cos 5p_2}{\cos 5p_1}$$

wherein $m_1$ and $m_2$ represent the pole strengths of the inner and outer needles respectively and $p_1$ and $p_2$ represent the pole angles of the inner and outer needles respectively.

4. In a magnetic compass, a pair of inner magnetic needles positioned with a pole angle of substantially 12°, a pair of outer magnetic needles positioned with a pole angle of substantially 48°, said needles being substantially parallel and having their like poles oriented in the same directions and all of their poles lying substantially on the same circle and being of substantially equal pole strength, and means to support said needles in the foregoing relationship.

EDWARD W. HART.

REFERENCES CITED

The following references are of record in the file of this patent:

UNITED STATES PATENTS

| Number | Name | Date |
| --- | --- | --- |
| 1,828,194 | Lietz | Oct. 20, 1931 |
| 2,361,548 | Kaufman et al. | Oct. 31, 1944 |